(12) United States Patent
Venkataramani et al.

(10) Patent No.: US 7,845,159 B2
(45) Date of Patent: Dec. 7, 2010

(54) HEAT PIPE-BASED COOLING APPARATUS AND METHOD FOR TURBINE ENGINE

(75) Inventors: Kattalaicheri Srinivasan Venkataramani, West Chester, OH (US); Thomas Ory Moniz, Loveland, OH (US); Justin P. Stephenson, Cincinnati, OH (US); William Andrew Bailey, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1133 days.

(21) Appl. No.: 11/469,131

(22) Filed: Aug. 31, 2006

(65) Prior Publication Data

US 2008/0053099 A1    Mar. 6, 2008

(51) Int. Cl.
F02K 99/00     (2009.01)
F02C 7/06      (2006.01)
F02C 7/00      (2006.01)
F28D 15/00     (2006.01)

(52) U.S. Cl. .................. 60/267; 60/779; 60/39.08; 165/104.14

(58) Field of Classification Search ............ 60/39.093, 60/779, 39.08, 39.83; 165/104.26, 104.11, 165/104.13, 104.14, 104.21, 50; 244/134 R, 244/134 B, 134 A; 415/175, 178, 176, 114, 415/108
See application file for complete search history.

(56) References Cited

U.S. PATENT DOCUMENTS

| | | | |
|---|---|---|---|
| 3,965,681 A | 6/1976 | Wyczalek et al. | |
| 4,186,559 A | 2/1980 | Decker et al. | |
| 4,199,300 A | 4/1980 | Tubbs | |
| 4,207,027 A | 6/1980 | Barry et al. | |
| 4,218,179 A | 8/1980 | Barry et al. | |
| 4,240,257 A | 12/1980 | Rakowsky et al. | |
| 4,419,044 A | 12/1983 | Barry et al. | |
| 4,671,348 A * | 6/1987 | Bauer | 165/41 |
| 4,782,658 A * | 11/1988 | Perry | 60/226.1 |
| 4,921,041 A * | 5/1990 | Akachi | 165/104.29 |
| 5,046,920 A | 9/1991 | Higashi et al. | |
| 5,178,514 A | 1/1993 | Damiral | |
| 5,192,186 A | 3/1993 | Sadler | |
| 5,439,351 A | 8/1995 | Artt | |
| 5,878,808 A | 3/1999 | Rock et al. | |
| 5,964,279 A | 10/1999 | Mochizuki et al. | |
| 5,975,841 A | 11/1999 | Lindemuth et al. | |
| 5,979,220 A | 11/1999 | Zombo et al. | |
| 6,241,189 B1 * | 6/2001 | Porte | 244/134 B |

(Continued)

FOREIGN PATENT DOCUMENTS

GB    2047811    * 12/1980

(Continued)

Primary Examiner—William H Rodríguez
Assistant Examiner—Gerald L Sung
(74) Attorney, Agent, or Firm—Adams Intellectual Property Law; David L. Narciso, Esq.

(57) ABSTRACT

A cooling apparatus is provided for a turbine engine of the type including an cowling with an outer surface defined by a skin exposed to an external air flow. The cooling apparatus includes at least one heat pipe disposed in the cowling. The heat pipe has a first end thermally coupled with the outer surface of the casing and a second end thermally coupled to a heat source, such that heat from the heat source can be transferred through the heat pipe to the external air flow.

20 Claims, 3 Drawing Sheets

U.S. PATENT DOCUMENTS

| | | |
|---|---|---|
| 6,308,524 B1 | 10/2001 | Mochizuki et al. |
| 6,766,817 B2 | 7/2004 | Da Silva |
| 6,918,404 B2 | 7/2005 | Dias Da Silva |
| 6,990,797 B2 | 1/2006 | Venkataramani et al. |
| 7,066,586 B2 | 6/2006 | Da Silva |
| 7,131,612 B2 * | 11/2006 | Baptist et al. ........... 244/134 R |
| 7,377,100 B2 * | 5/2008 | Bruno et al. .................. 60/267 |
| 2005/0050877 A1 * | 3/2005 | Venkataramani et al. . 60/39.093 |

FOREIGN PATENT DOCUMENTS

| | | |
|---|---|---|
| GB | 2136880 A | 9/1984 |

* cited by examiner

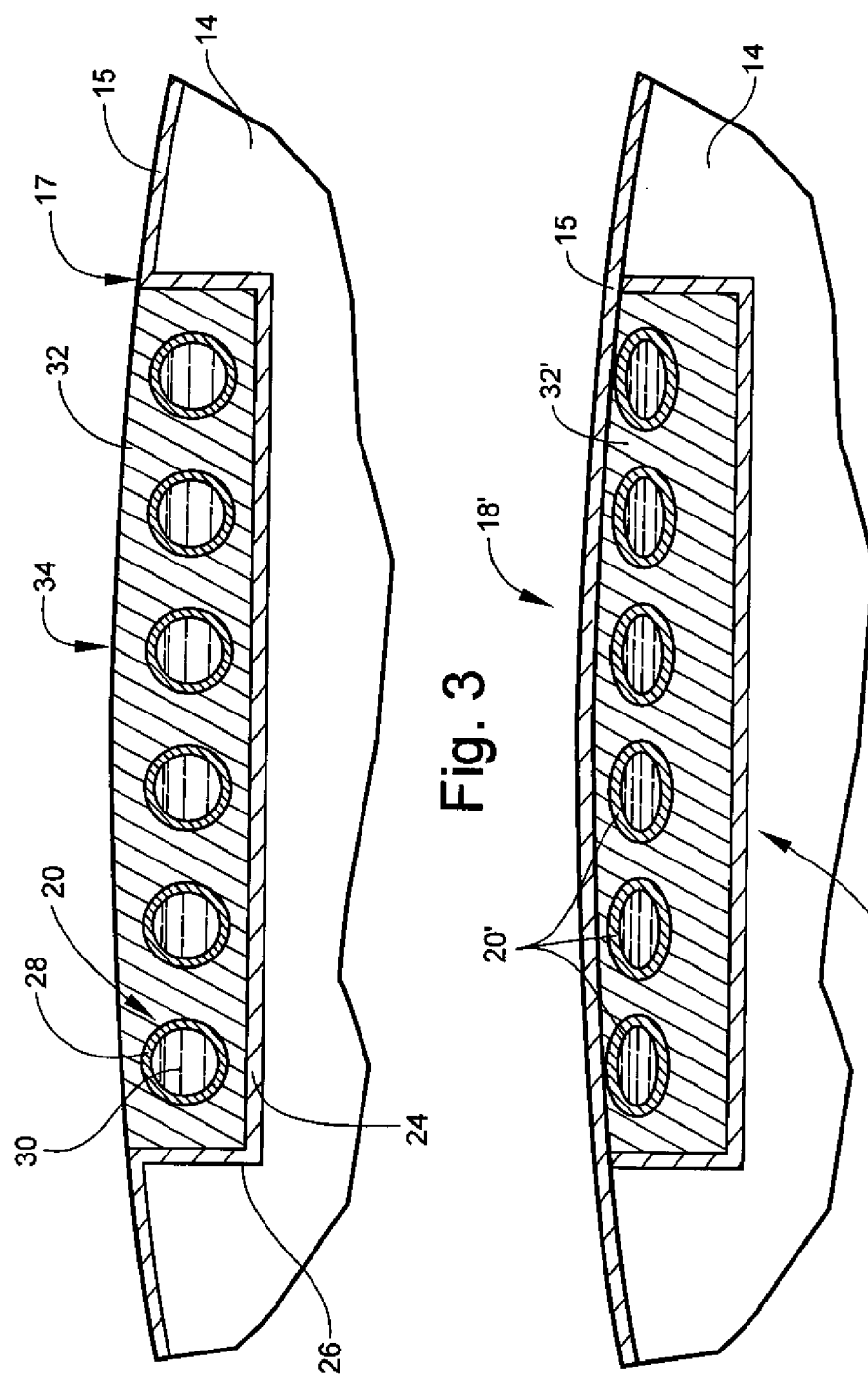

HEAT PIPE-BASED COOLING APPARATUS AND METHOD FOR TURBINE ENGINE

BACKGROUND OF THE INVENTION

This invention relates generally to turbine engines, and more particularly to a cooling apparatus for transferring excess heat from a gas turbine engine.

Gas turbine engines use pressurized oil to lubricate and cool various components (e.g. bearings, etc.). The oil picks up significant heat in the process which must be rejected to maintain the oil temperature within acceptable limits. Prior art gas turbine engines often employ heat exchangers to cool the engine oil using a relatively cool air stream such as fan discharge air. In turbofan engines, this heat exchanger is often located in the fan duct flow path. This configuration results in a pressure loss and hence a significant fuel burn penalty. It has been estimated that the specific fuel consumption (SFC) penalty associated with this type of configuration can be as high as 1%. There are also cost and weight penalties associated with this configuration.

BRIEF SUMMARY OF THE INVENTION

The above-mentioned shortcomings in the prior art are addressed by the present invention, which provides a cooling apparatus that removes waste heat from the engine lubrication oil and rejects that heat to the external environment. This heat is transferred using heat pipes which are lightweight, sealed, and passive, requiring no valves or pumps. Furthermore, the heat pipes may use a working fluid which is non-flammable to avoid creating a fire hazard within the engine.

According to one aspect of the invention, a cooling apparatus is provided for a turbine engine of the type including a cowling with an outer surface defined by a skin exposed to an external air flow. The cooling apparatus includes: at least one heat pipe disposed in the cowling, the heat pipe having a first end thermally coupled with the outer surface of the casing and a second end thermally coupled to a heat source, such that heat from the heat source can be transferred through the heat pipe to the external air flow.

According to another aspect of the invention, a gas turbine engine includes: a casing; a cowling surrounding the casing, the cowling including an outer surface defined by a skin exposed to an external air flow; and at least one heat pipe disposed in the cowling, the heat pipe having a first end thermally coupled with the outer surface and a second end thermally coupled to a heat source, such that heat from the heat source can be transferred through the at least one heat pipe to the external air flow.

According to another aspect of the invention, a method is provided for cooling a fluid in a turbine engine of the type having a cowling including an outer surface defined by a skin exposed to an external air flow. The method includes: providing at least one heat pipe disposed in the cowling; coupling a first end of the at least one heat pipe with the outer surface; coupling a second end of the at least one heat pipe to a source of heated fluid within the engine; and receiving heat from the fluid in the at least one heat pipe and transferring the heat through the outer surface to the external air flow.

BRIEF DESCRIPTION OF THE DRAWINGS

The invention may be best understood by reference to the following description taken in conjunction with the accompanying drawing figures in which:

FIG. 3 is a cross-sectional view of a cooler taken along lines 3-3 of FIG. 2; and FIG. 4 is a cross-sectional view of a cooler constructed according to another aspect of the invention.

DETAILED DESCRIPTION OF THE INVENTION

Figure 1:
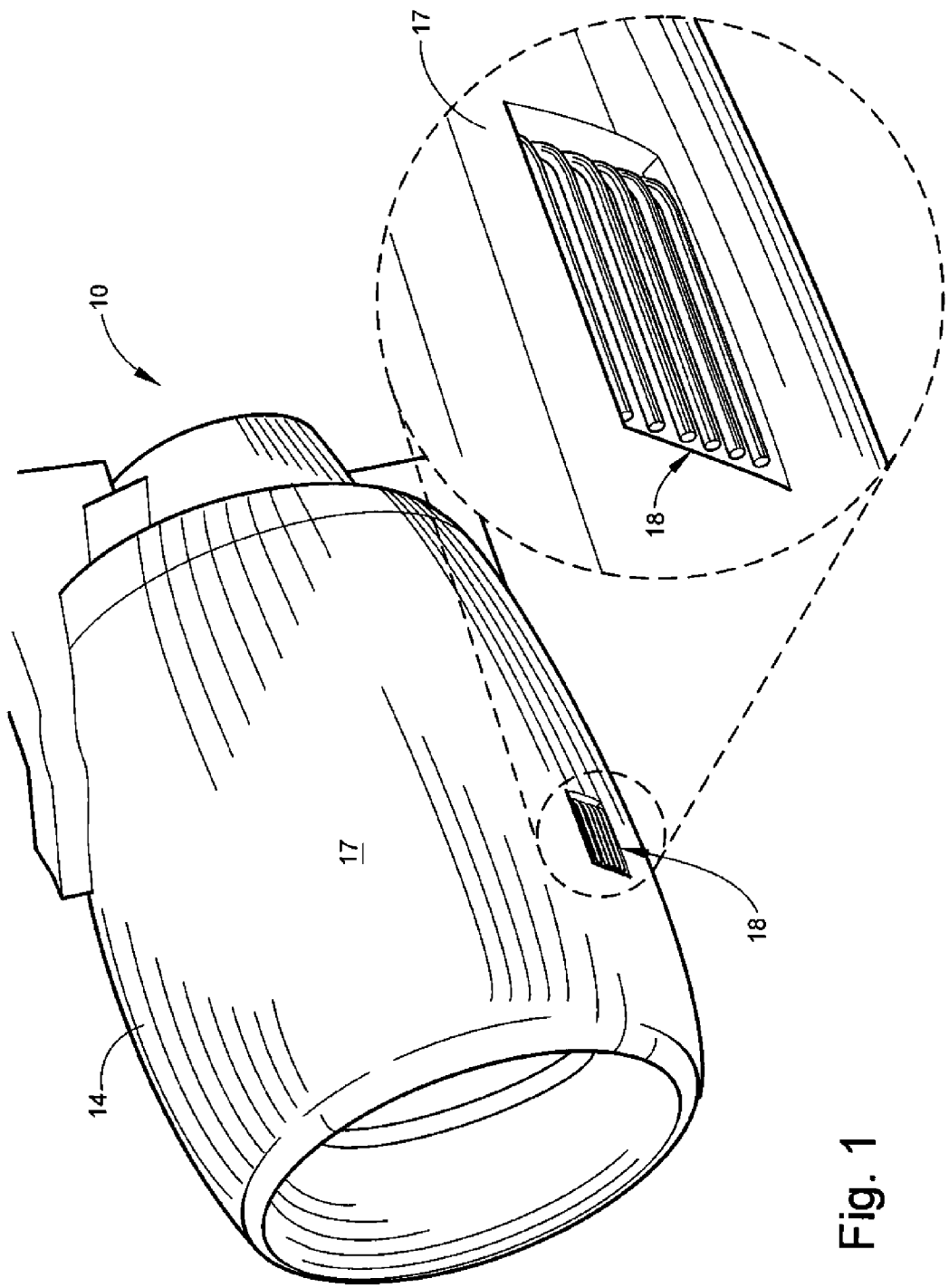
FIG. 1 is a perspective view of a portion of a gas turbine engine including a nacelle and bypass duct constructed in accordance with an aspect of the present invention.
Figure 2:
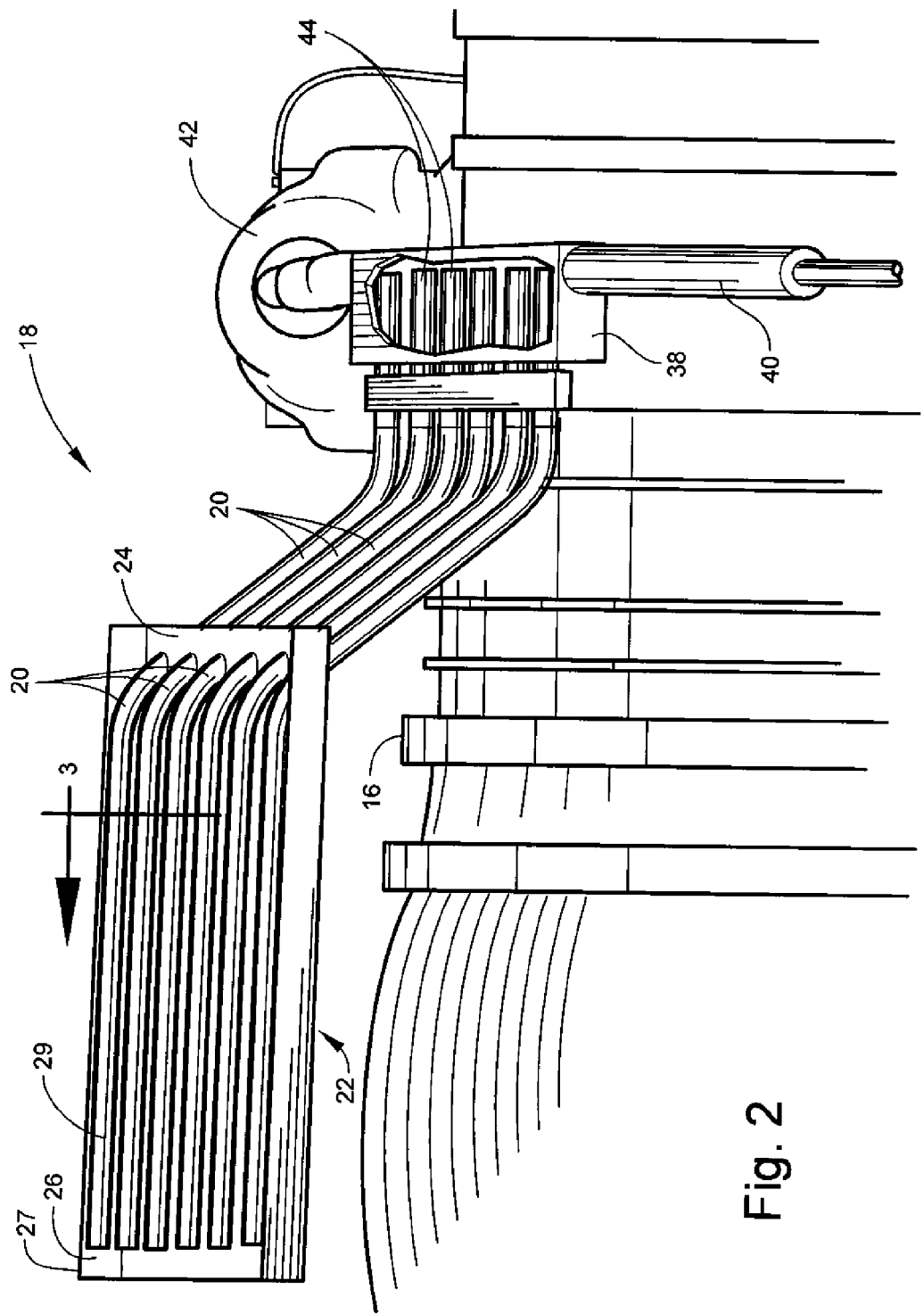
FIG. 2 is a perspective view of a cooling apparatus constructed in accordance with an aspect of the invention, mounted within the engine of FIG. 1.

Referring to the drawings wherein identical reference numerals denote the same elements throughout the various views, FIGS. 1 and 2 illustrate a nacelle 10 which encloses a gas turbine engine. In this example, the nacelle 10 includes a fan cowling 14 having an outer skin 15 (see FIG. 3) which defines an outer surface 17 of the fan cowling 14 that is exposed to external air flow. The fan cowling 14 surrounds a fan casing 16 which in turn surrounds a rotating fan (not shown). The fan cowling 14 provides a flowpath for the portion of the air ejected by the fan which does not enter the "core" of the engine. The present invention is equally applicable to other engine configurations, for example pure turbojet engines lacking a fan cowling. A cooling apparatus 18 is disposed in the fan cowling 14 in thermal communication with the external flow over the fan cowling 14. In FIG. 1, the components of the cooling apparatus 18 are exposed for illustrative clarity; however in use the cooling apparatus is covered with an outer skin that is aerodynamically smooth to the airflow, as described below.

FIGS. 2 and 3 show the details of construction of the cooling apparatus 18 and its connection to the engine's oil system. The cooling apparatus 18 includes a plurality of heat pipes 20. In the illustrated example, the heat pipes 20 are positioned in a side-by-side parallel array inside of an open tray 22, which has an inner panel 24 and a peripheral wall 26 defining an opening 27. It is noted that the axial and radial extent of the cooling apparatus 18 can be varied as need to suit a particular application. For example, a greater number of heat pipes 20 could be used so that the apparatus 18 extends over a much larger portion of the circumference of the fan cowling 14. The ends or portions of the heat pipes 20 disposed within the tray 22 are denoted "cold" or "condenser" ends 29, and are thermally coupled with the outer surface 17 of the fan cowling 14.

Each heat pipe 20 has an elongated outer wall 28 with closed ends which defines a cavity 30. The cavity 30 is lined with a wick or other capillary structure (not shown) and holds a working fluid. Various working fluids, such as gases, water, organic substances, and low-melting point metals are known for use in heat pipes. The working fluid may be non-flammable so as to avoid introducing a fire hazard into the area of the fan casing 16 in the event of a leak or break in the heat pipe 20.

The heat pipes 20 may be "potted" in a filler material 32 disposed inside the tray 22. For clarity, the filler material 32 shown only in FIG. 3 and is not illustrated in FIG. 2. Any material which will maintain its shape and which has relatively high thermal conductivity may be used, such as metals, conductive pastes, or plastics. The filler material 32 acts to hold the heat pipes 20 in the desired position and spacing. The outer face 34 of the filler material 32 is shaped to conform to the surface defined by the outer skin 15 of the fan cowling 14, and provides a heat transfer path from the heat pipes 20 to the external air flow.

The heat pipes 20 are highly efficient at transferring heat. For example, their effective thermal conductivity is several orders of magnitude higher than that of solid copper. The number, length, diameter, shape, working fluid, and other performance parameters of the heat pipes 20 are selected to achieve the desired degree of heat transfer during engine operation. The operation of the heat pipes 20 are described in more detail below.

While shown as circular in FIG. 3, the portion of the heat pipes 20 that lie in the tray 22 may be formed into oval, flatted, or other non-circular cross-sectional shapes to accommodate a desired cross-sectional area while improving packaging volumetric or heat transfer. For example, FIG. 4 illustrates a slightly different cooling apparatus 18' including a tray 22', heat pipes 20', and a filler material 32'. In this variation, the skin 15 of the fan cowling 14 extends over the filler material 32'. The heat pipes 20' are positioned against the interior surface of the skin 15 and are flattened into an oval shape to enhance heat transfer to the skin 15. Using this configuration, the exterior aerodynamic profile of the fan cowling 14 is preserved without interruption.

Referring again to FIG. 2, a heat exchanger 38 is mounted on the outside of the fan casing 16. The heat exchanger 38 may simply be a housing with an open interior. In the illustrated example, oil from the engine's lubrication system enters the heat exchanger 38 through a scavenge line 40. After exiting the heat exchanger 38, it passes into a storage tank 42 until needed, at which time it flows back to the engine's lubrication system. The remainder of the oil storage, circulation, and distribution system is conventional within the gas turbine engine art, and not discussed here. If desired, the cooling apparatus 18 could be used to remove heat from another type of heat source, for example by connecting it to another fluid system within the engine.

One end of each heat pipe 20 is disposed inside the heat exchanger 38. This portion is designated as a "hot" or "evaporator" end 44 of the heat pipe 20. It is noted that terms "hot", "evaporator", "cold", and "condenser", when used in relation to the heat pipes 20, describe the positioning of the heat pipes 20 in areas of relatively high or low temperature, and are not related to any particular aspect of the structure of the heat pipes 20 themselves.

Thermal insulation, which is not illustrated for clarity, may be provided within the cooler and associated structure wherever it is desired to prevent heat loss. For example, insulation may be placed around the exterior of the tray 22, around the exposed portions of the heat pipes 20, and around the heat exchanger 38.

In operation, oil which has absorbed heat from various parts of the engine is circulated into the heat exchanger 38 where it heats the hot or evaporator ends 44 of the heat pipes 20. The heat removal cools the oil to an acceptable working temperature so that it can be passed into the storage tank 42 and subsequently re-circulated through the engine. The working fluid within the heat pipes 20 absorbs that heat and evaporates. The vapor generated then travels through the cavities 30, and condenses at the cold ends 29 of the heat pipes 20, thereby transferring heat to the cold ends 29. A wick or other capillary structure that extends from one end of the heat pipe 20 to the other transports the condensed liquid back to the hot end 44, for example, by capillary action, thereby completing the circuit. The heat in the cold ends 29 is transferred to the external airflow through the filler material 32 and/or the skin 15 of the fan cowling 14.

The cooling apparatus 18 described herein, being passive, needs no valves and is sealed. The number, size, and location of the heat pipes 20 can be selected to provide heat removal and transfer as needed. This configuration does away with the prior art heat exchanger inside the fan duct flow path and provides the benefit of improved SFC. Foreign object damage is also less of a concern as compared to the prior art since there are no exposed heat exchanger parts to be struck inside the fan duct flow path. Furthermore, water may be used as the heat pipe working fluid thus ensuring a non-toxic and non-flammable design.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A cooling apparatus for a turbine engine including a cowling with an outer surface defined by a skin exposed to an external air flow, the cooling apparatus comprising:
    at least one heat pipe having a first end thermally coupled with the outer surface of the cowling and a second end thermally coupled to a heat source, such that heat from the heat source can be transferred through the heat pipe to the external air flow; and
    a tray attached to the cowling defining an opening disposed in thermal communication with the outer surface, wherein the first end of the at least one heat pipe is substantially enclosed between the tray and the cowling, and wherein the tray is filled with a thermally conductive filler material that surrounds the first end of the at least one heat pipe.

2. The cooling apparatus of claim 1 wherein a second end of the at least one heat pipe is disposed inside a hollow interior of a heat exchanger adapted to receive a flow of heated fluid therethrough.

3. The cooling apparatus of claim 1 wherein a plurality of heat pipes are disposed in a spaced-apart array within the tray.

4. The cooling apparatus of claim 1 wherein the end of the at least one heat pipe within the tray has a non-circular cross-sectional shape.

5. The cooling apparatus of claim 1 wherein an outer face of the filler material is shaped to define a portion of the outer surface of the cowling.

6. The cooling apparatus of claim 1 wherein the skin of the cowling extends over the opening of the tray.

7. The cooling apparatus of claim 6 wherein the at least one heat pipe is disposed against an interior surface of the skin.

8. The cooling apparatus of claim 1 wherein each heat pipe includes an elongated outer wall with closed ends defining a cavity that contains a working fluid.

9. The cooling apparatus of claim 1 wherein the heat source is lubricating oil from the turbine engine, and the cooling apparatus facilitates maintaining the lubricating oil at an acceptable working temperature.

10. A gas turbine engine comprising:
    a cowling including an outer surface defined by a skin exposed to an external air flow; and
    at least one heat pipe disposed in the cowling, the heat pipe having a first end thermally coupled with the outer surface and a second end thermally coupled to a heat source, such that heat from the heat source can be transferred through the at least one heat pipe to the external air flow; and
    a tray attached to the cowling defining an opening disposed in thermal communication with the outer surface, wherein the first end of the at least one heat pipe is substantially enclosed between the tray and the cowling, and wherein the tray is filled with a thermally conductive filler material that surrounds the first end of the at least one heat pipe.

11. The gas turbine engine of claim 10 wherein a second end of the at least one heat pipe is disposed inside a hollow interior of a heat exchanger which is carried by a casing disposed inside the cowling, the heat exchanger adapted to receive a flow of heated fluid therethrough.

12. The gas turbine engine of claim 10 wherein a plurality of heat pipes are disposed in a spaced-apart array within the tray.

13. The gas turbine engine of claim 10 wherein the end of the at least one heat pipe within the tray has a non-circular cross-sectional shape.

14. The gas turbine engine of claim 10 wherein an outer face of the filler material is shaped to define a portion of the outer surface of the cowling.

15. The gas turbine engine of claim 10 wherein the skin of the cowling extends over the opening of the tray.

16. The gas turbine engine of claim 15 wherein the at least one heat pipe is disposed against an interior surface of the skin.

17. The gas turbine engine of claim 10 wherein each heat pipe includes an elongated outer wall with closed ends defining a cavity that contains a working fluid.

18. The gas turbine engine of claim 10 wherein the heat source is lubricating oil from the turbine engine, and the cooling apparatus facilitates maintaining the lubricating oil at an acceptable working temperature.

19. A method for cooling a fluid in a turbine engine having a cowling including an outer surface defined by a skin exposed to an external air flow, the method comprising: providing at least one heat pipe; coupling a first end of the at least one heat pipe with the outer surface; providing a tray attached to the cowling defining an opening disposed in thermal communication with the outer surface, wherein the first end of the at least one heat pipe is substantially enclosed between the tray and the cowling, and wherein the tray is filled with a thermally conductive filler material that surrounds the first end of the at least one heat pipe; coupling a second end of the at least one heat pipe to a source of heated fluid within the engine; and receiving heat from the fluid in the at least one heat pipe and transferring the heat through the outer surface to the external air flow.

20. The method of claim 19 wherein the heated fluid is lubrication oil from the turbine engine, and sufficient heat is removed from the cooling oil to maintain the lubricating oil at an acceptable working temperature.

* * * * *